United States Patent
Olsen et al.

(10) Patent No.: US 6,754,625 B2
(45) Date of Patent: Jun. 22, 2004

(54) AUGMENTATION OF ALTERNATE WORD LISTS BY ACOUSTIC CONFUSABILITY CRITERION

(75) Inventors: Peder Andreas Olsen, New York, NY (US); Michael Alan Picheny, White Plains, NY (US); Harry W. Printz, New York, NY (US); Karthik Visweswariah, Jefferson Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 09/746,892

(22) Filed: Dec. 26, 2000

(65) Prior Publication Data

US 2002/0116191 A1 Aug. 22, 2002

(51) Int. Cl.[7] .......................... G10L 15/26; G10L 15/22
(52) U.S. Cl. ...................... 704/235; 704/251; 704/255; 704/257; 704/270
(58) Field of Search ............................... 704/251, 255, 704/257, 268, 270, 275, 256, 235; 382/187

(56) References Cited

U.S. PATENT DOCUMENTS

| | | | | |
|---|---|---|---|---|
| 4,400,828 A | * | 8/1983 | Pirz et al. ...................... | 382/30 |
| 5,737,723 A | * | 4/1998 | Riley et al. ................... | 704/243 |
| 6,064,959 A | * | 5/2000 | Young et al. ................ | 704/251 |
| 6,151,575 A | * | 11/2000 | Newman et al. ............. | 704/260 |
| 6,182,039 B1 | * | 1/2001 | Rigazio et al. .............. | 704/257 |
| 6,246,980 B1 | * | 6/2001 | Glorion et al. .............. | 704/231 |
| 6,363,347 B1 | * | 3/2002 | Rozak ........................ | 704/244 |

OTHER PUBLICATIONS

Printz et al., "Theory and Practice of Acoustic Confusability", Reprinted from *Proceedings of the ISCA ITRW ASR2000*, pp. 77–84, Paris, France, Sep. 18–20, 2000.

* cited by examiner

*Primary Examiner*—Susan McFadden
(74) *Attorney, Agent, or Firm*—F.Chau & Associates, LLC; Thu A. Dang (57) ABSTRACT

There is provided a method for augmenting an alternate word list generated by a speech recognition system. The alternate word list includes at least one potentially correct word for replacing a wrongly decoded word. The method includes the step of identifying at least one acoustically confusable word with respect to the wrongly decoded word. The alternate word list is augmented with the at least one acoustically confusable word.

22 Claims, 3 Drawing Sheets

AUGMENTATION OF ALTERNATE WORD LISTS BY ACOUSTIC CONFUSABILITY CRITERION

BACKGROUND

1. Technical Field

The present invention generally relates to speech recognition systems and, in particular, to a method for augmenting alternate word lists from which a correct word is selected in place of a word wrongly decoded by a speech recognition system. The method employs acoustic confusability criterion to augment such alternate word lists.

2. Background Description

Conventional speech recognition systems generally include facilities that allow a user to correct decoding errors. In particular, when a user determines that a word has been wrongly decoded, the user may query the system for a list of alternative words corresponding to that word. In general, such a list contains high-probability alternatives to the word decoded at each position of an audio stream. These alternatives are computed live from the audio stream in question, and reflect the normal operation of the speech recognition engine, which must typically choose, from among several possible decodings of each segment of the audio stream, the preferred word to transcribe.

By "normal operation of the speech recognition engine", we mean the following. Let $h=w_1,w_2, \ldots, w_{i-1}$ represent some sequence of decoded words, corresponding to some portion of the audio stream $a(w_i,w_2, \ldots, w_{i-1})$. Typically, the exact end time of word $w_{i-1}$ is not known, and the system proceeds by considering a range of possible end times of this word, and there for start times of the next word.

The system must now guess the identity of the next word $w_i$ based upon consideration of the acoustic signal $a(w_i, w_{i+1}, \ldots)$ and likewise consideration of the words decoded up to that point, which is the sequence h defined above. There is a principled way of making this guess, which is to consider the product $p(a(w_i)|x) \cdot p(x|h)$, as xruns over various words in the recognizer vocabulary. In this expression, the first factor, $p(a(w_i)|x)$, is known as the acoustic model probability, and the second factor, $p(x|h)$, is known as the language model probability. In general, these raw values may be geometrically or otherwise weighted before being combined. However, to simplify this discussion, the acoustic model probability and the language model probability will be combined by simply computing their product, as indicated above.

Although in principle this product could be evaluated for every word x of the recognizer's vocabulary, this is seldom done in practice. Instead, some short list of candidates is first computed. For instance, only the top N words of the vocabulary may be retained for further consideration, when ranked according to the language model score $p(x|h)$. Let us refer to this as the list of language model candidates C. Typically, acoustic model scores $p(a(w_i)|x)$ are then computed only for x∈C. Thereafter, a further winnowing of the elements of C will occur, retaining, for example, only the top M words of C when ranked according to the product $p(a(w_i)|x) \cdot p(x|h)$. Alternatively, the system may retain only those words x' such that the product $p(a(w_i)|x') \cdot p(x'|h)$ lies within some fixed fraction of the maximal value $p(a(w_i)|\hat{x}) \cdot p(\hat{x}|h)$.

The resulting set of candidates or hypotheses then comprises the list of alternate words for the given segment of the acoustic signal. Note that it is entirely possible that this set may contain only one single element, $\hat{x}$. It is also possible that this word may be wrong, and the correct word may not be included within the alternate word list.

The system retains in memory this list of possibilities, associated with the given segment. The system typically computes and retains as well the product $p(a(w_i)|x) \cdot p(x|h)$ cited above, or some other figure of merit for each word in the list. When the user determines that an error has been made in a particular position of the audio stream, the system presents this list of possible words to the user; the user may then select the correct word from among the list of possible words if the correct word is present, or type in a completely different word if the correct word is not present. It is of course much more convenient if the correct word appears in the list. Unfortunately this is not always the case; indeed frequently NO alternatives are presented. The invention is a method for augmenting such alternate word lists, increasing the odds that the correct word will be presented to the user.

Accordingly, it would be desirable and highly advantageous to have a method for augmenting such alternate word lists, to increase the probability that the correct word is presented to the user. Such a method should also increase the convenience of using a speech recognition system employing the same.

SUMMARY OF THE INVENTION

The problems stated above, as well as other related problems of the prior art, are solved by the present invention, a method for augmenting alternate word lists generated by a speech recognition system. The alternate word lists are used to provide words from which a user may select a correct word in a place of a wrongly decoded word by the system. The method employs acoustic confusability criterion to augment such alternate word lists.

The use of augmented alternate word lists according to the invention significantly increases the number of times that the alternate word lists contain the correct word. Thus, the convenience of using a speech recognition system is increased.

According to a first aspect of the invention, there is provided a method for augmenting an alternate word list generated by a speech recognition system. The alternate word list includes at least one potentially correct word for replacing a wrongly decoded word. The method includes the step of identifying at least one acoustically confusable word with respect to the wrongly decoded word. The alternate word list is augmented with the at least one acoustically confusable word.

According to a second aspect of the invention, the augmenting step includes the step of adding the at least one acoustically confusable word to the alternate word list.

According to a third aspect of the invention, the system includes a vocabulary having a plurality of words included therein, and the identifying step includes the steps of: respectively determining a similarity between pronunciations of each of at least one of the plurality of words included in the vocabulary with respect to the wrongly decoded word; and respectively expressing the similarity by a score.

According to a fourth aspect of the invention, the identifying step identifies the at least one acoustically confusable word based on the score.

According to a fifth aspect of the invention, the at least one acoustically confusable word includes a plurality of acoustically confusable words, and the augmenting step includes the steps of: ranking each of the plurality of acoustically confusable words based on the score; and adding at least one of the plurality of acoustically confusable words to the alternate word list, in descending order with respect to the score.

According to a sixth aspect of the invention, the augmenting step further includes the step of restricting a number of words added to the alternate word list based on a predefined threshold.

According to a seventh aspect of the invention, the predefined threshold corresponds to a maximum number of words to be added to the alternate word list.

According to a eighth aspect of the invention, the predefined threshold corresponds to a maximum size of the alternate word list.

According to a ninth aspect of the invention, the predefined threshold corresponds to a minimum score for words to be added to the alternate word list.

According to a tenth aspect of the invention, the at least one potentially correct word includes a plurality of potentially correct words and the at least one acoustically confusable word includes a plurality of acoustically confusable words, and the method further includes the step of inserting at least some of the plurality of acoustically confusable words in the alternate word list so as to be disposed in alternating positions with respect to at least some of the plurality of potentially correct words.

According to an eleventh aspect of the invention, the some of the plurality of acoustically confusable words are inserted in the alternate word list in descending order with respect to the score.

According to a twelfth aspect of the invention, the adding step adds only words not already present in the alternate word list.

According to a thirteenth aspect of the invention, the at least one potentially correct word includes a plurality of potentially correct words and the at least one acoustically confusable word includes a plurality of acoustically confusable words, and the augmenting step includes the steps of: determining a first regression function that estimates, for each of the plurality of acoustically confusable words, a probability that the each of the plurality of acoustically confusable words is correct based on the score of the each of the plurality of acoustically confusable words; and determining a second regression function that estimates, for each of the plurality of potentially correct words, a probability that the each of the plurality of potentially correct words is correct based on the score of the each of the plurality of potentially correct words; combining the plurality of acoustically confusable words and the plurality of potentially correct words; and sorting the plurality of acoustically confusable words and the plurality of potentially correct words based on the probability respectively estimated by the first and the second regression functions.

According to a fourteenth aspect of the invention, the speech recognition system includes a vocabulary having a plurality of words included therein, and the method further includes the step of determining the at least one acoustically confusable word with respect to each of at least one of the plurality of words included in the vocabulary.

According to a fifteenth aspect of the invention, the method further includes the step of pre-storing in a database a plurality of entries for at least some of the plurality of words comprised in the vocabulary, each of the plurality of entries including at least one word that is acoustically confusable with respect to each of the at least some of the plurality of words included in the vocabulary.

According to a sixteenth aspect of the invention, the identifying step includes the step of accessing the database to determine whether there exists an entry for the wrongly decoded word.

According to a seventeenth aspect of the invention, each of the plurality of entries further includes, for each of the at least one word, a score that represents a probability of acoustic confusion between the wrongly decoded word and the at least one word.

According to an eighteenth aspect of the invention, the method is implemented by a program storage device readable by machine, tangibly embodying a program of instructions executable by the machine to perform the method steps.

According to a nineteenth aspect of the invention, there is provided a method for augmenting an alternate word list generated by a speech recognition system. The alternate word list includes at least one potentially correct word for replacing a wrongly decoded word. The method includes the step of identifying a set of acoustically confusable words with respect to the wrongly decoded word. The alternate word list is augmented with at least one acoustically confusable word from the set, based on a similarity of pronunciations between the wrongly decoded word and the at least one acoustically confusable word from the set.

According to a twentieth aspect of the invention, in a speech recognition system having a vocabulary, there is provided a method for augmenting an alternate word list generated by the system. The alternate word list includes at least one potentially correct word for replacing a wrongly decoded word. The method includes the step of identifying a set of acoustically confusable words with respect to the wrongly decoded word, based on a similarity of pronunciations therebetween. The alternate word list is augmented with at least one acoustically confusable word from the set.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for augmenting alternate word lists generated by a speech recognition system. The method employs acoustic confusability criterion to augment such alternate word lists.

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
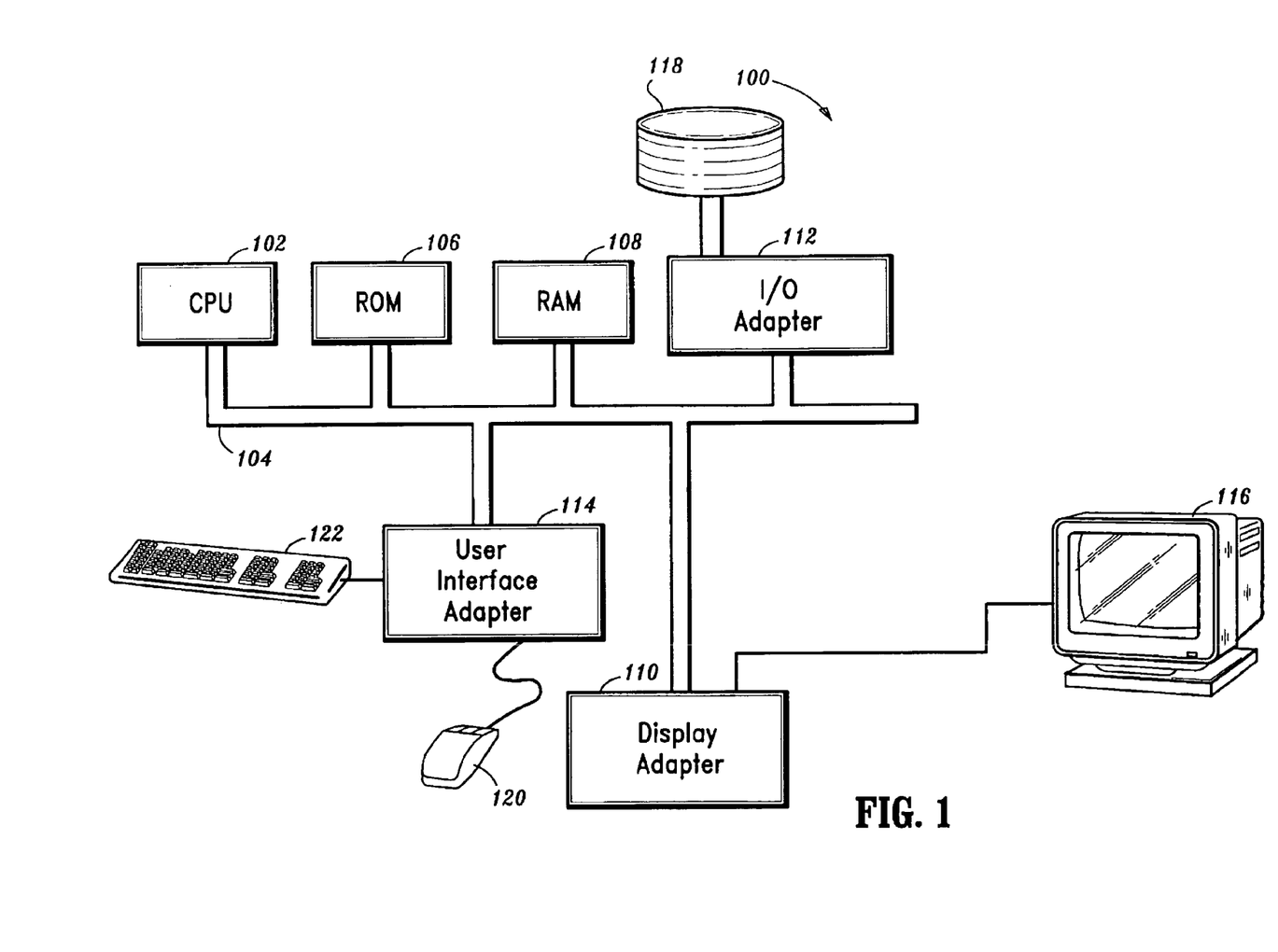
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. Such computer processing system 100 is intended to part of a speech recognition system or, more preferably, to have speech recognition processes executed thereon.

The computer processing system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100.

As noted above, the computer processing system 100 is intended to part of a speech recognition system or, more preferably, to have speech recognition processes executed thereon. In either case, as is known, speech recognition systems include other elements (e.g., microphone) which are not depicted in FIG. 1 or the Figures thereafter.

In augmenting the alternate word lists generated by a speech recognition system, words that may be acoustically confusable with a wrongly decoded word are determined. One method for computing confusable words is described by Olson et al., in "Theory and Practice of Acoustic Confusability", Proceedings of ASR 2000, Paris, France, September 2000. Such method is also described in U.S. Ser. No. 60/199,062, entitled "theory and Practice of Acoustic Perplexity", filed on Apr. 20, 2000, which is commonly assigned, and the disclose of which is incorporated by reference herein. According to the present invention, these precomputed confusable words may be used to enhance the quality of alternate word lists generated by a speech recognition system. It is to be appreciated that while the present invention is described herein with reference to the above mentioned method for computing confusable words, the invention is not so limited; thus, any method for computing the confusability between two or more words may be used while maintaining the spirit and scope of the present invention.

The method for computing confusable words referenced above allows for the computation of how similar two word pronunciations sound. In particular, given pronunciations of two words $l_1$ and $l_2$, a number $P(l_1|l_2)$ can be computed which ranges between zero and one and measures the confusability of the two pronunciation. The closer the number is to 1 the more confusable the words are acoustically. The confusability numbers also satisfy the property that given $l_2$, the sum of $P(l|l_2)$ over all 1 is one. Thus, $P(l|l_2)$ is a probability distribution on the set of all pronunciations of all words.

Suppose that the user utters the words $u_1, u_2, \ldots, u_n$, and the speech decoder decodes the words $w_1, W_2 \ldots, w_n$. The user notices that a particular word, for example wi, was decoded in error. The user can query the system to provide alternates for $w_i$, nominally those alternatives as determined by conventional methods. However, the list may be too short, or even empty. To provide extra alternates for the word using acoustic confusability, the probability that a word w is the true word is computed, given that the word $w_i$ was decoded. This probability is denoted by $P(w|w_i)$. The words can then be ranked in decreasing order of $P(w|w_i)$ and the top few words used to augment the alternate word lists. It is to be appreciated that determining this list of acoustic confusability alternates does not require inspection of the user's audio data associated with position i. The acoustic confusability alternates can be determined once for all time, stored in the computer's memory, and then accessed as required.

In augmenting the alternate word lists provided by the speech recognition system, two issues are implicated. First, how do we compute $P(w|w_i)$. Second, how do we use these scores to augment the lists generated by the engine.

With respect to the first issue, three illustrative methods for computing the score $P(w|w_i)$ will now be described. All these methods rely on an underlying method to compute $P(l_1|l_2)$ given two pronunciations $l_1$ and $l_2$. As noted above, while the underlying method described in the above referenced article by Olsen is employed herein for illustrative purposes, it is to be appreciated that the invention is not so limited and, thus, any method which measures the similarity in the pronunciations of words can be applied. It is to be noted that the probability $P(l_2|l_1)$ need not be equal to $P(l_1|l_2)$ Let the set of all words be denoted by V. Given a word v, let L(v) denote the pronunciations of the word v.

The first illustrative method for computing $P(w|w_i)$ is represented mathematically as follows:

$$P(w w_i) = \sum_{l_1 \in L(w)} \sum_{l_2 \in L(w_i)} P(l_1 l_2) P(l_2 w_i)$$

For $l_2 \in L(w_i)$, $P(l_2|W_i)$ the probability that a particular pronunciation of word $w_i$ is used. In tests conducted with respect to the invention, a uniform estimate was used for this distribution, though any other estimate of the distribution could be used while maintaining the spirit and scope of the invention.

The first illustrative method for computing $P(w|w_i)$ may be summarized as follows. The score that we want is $P(w|w_i)$, which is the probability that word $w$ will be confused for word $w_i$. This probability is found by combining the probabilities of confusion for each pronunciation for $w$ and $w_i$, the confusions being combined in proportion to the probability that a particular pronunciation of a word is used.

The second illustrative method for computing $P(ww_i)$ is represented mathematically as follows:

$$P(ww_i) = \sum_{l_1 \in L(w)} \sum_{l_2 \in L(w_i)} Q(l_1 l_2) P(l_2 w_i)$$

In the preceding equation, $$Q(l_1 l_2) = \left[ \frac{P(l_2 l_1) P(l_1 w) P(w)}{\sum_{v \in V} \sum_{l \in L(v)} P(l_2 l) P(l v) P(v)} \right],$$

where $P(v)$ denotes a unigram language model estimate of the probability of occurrence of word $v$.

The second illustrative method for computing $P(w|w_i)$ may be summarized as follows. Recall that $P(l_2|l_1)$ is a probability of confusing the word pronunciations $l_1$ and $l_2$, as detailed in the work of Printz and Olsen cited above. In the first illustrative method for computing $P(w|w_i)$ we used these probabilities directly. In the second illustrative method for computing $P(w|w_i)$ we use these values along with Bayes's theorem to generate a different measure $Q(l_1|l_2)$ for confusion between pronunciations. We then use this measure for confusion as in the first illustrative method for computing $P(w|w_i)$.

The third illustrative method for computing $P(w|w_i)$ is represented mathematically as follows:

$$P(ww_i) = \sum_{l_1 \in L(w)} \sum_{l_2 \in L(w_i)} Q(l_1 l_2) P(l_2 w_i)$$

In the preceding equation, $$Q(l_1 l_2) = \left[ \frac{P(l_2 l_1) P(l_1 w)}{\sum_{v \in V} \sum_{l \in L(v)} P(l_2 l) P(l v) P(v)} \right]$$

This is the same as the second illustrative method for computing $P(w|w_i)$ if a uniform estimate is used for the probabilities of words in the second illustrative method.

In the third illustrative method for computing $P(w|w_i)$ as in the second such method, a new measure of confusabilities of two pronunciations is obtained using the underlying confusability scores. To obtain the new score, Bayes's theorem is employed (as in the second illustrative method for computing $P(w|w_i)$. To use Bayes's theorem, we need the probability that a certain word is used. Unlike in the second illustrative method for computing $P(w|w_i)$, where the probabilities of words are estimated by their frequency of occurrence, a uniform estimate is used for the probabilities of words.

It is to be noted that the speech decoder produces a lexeme (a particular pronunciation of a particular word) as its output, and not just a word, though only the word is displayed to the user. This information could be used to provide a list of confusable words for the given lexeme $l_i$ rather than for the word $w_i$. In the three methods listed above, this would mean removing the inner summation over the lexemes of $w_i$, and leaving out the term $P(l_2|W_i)$.

As noted above, $P(w|w_i)$ is the probability that $w$ is the true word given that $w_i$ was decoded. Once a value for $P(w|w_i)$ is computed, these words can be sorted in decreasing order of $P(w|w_i)$ and then combined with the alternate words that any other method generates, such as conventional methods. There are several different methods for combining the two lists together. Let us assume that we want a maximum of M alternates. Let the list of words (a) and scores (s) that the current system generates be denoted by $(a_1 s_1), (a_2 s_2), \ldots, (a_k, s_k)$. The list (word b and score t) generated by any of the methods given above is denoted by $(b_1 t_1), (b_2 t_2), \ldots, (b_m, t_m)$ Assume that both the lists are in order of decreasing score. Note that the invention generates a list of alternates with size possibly smaller than the maximum size allowed M.

Three illustrative methods for combining an alternate word list generated by the method of the invention with another alternate word list (e.g., generated by conventional methods) will now be described. It is to be appreciated that the invention is not limited to being combined as described in the following three illustrative methods and, thus, any other method for combining such alternate word lists may be employed. Given the teachings of the invention provided herein, one of ordinary skill in the related art will readily contemplate these and various other methods for combining an alternate word list generated by the method of the invention with other alternate word lists while maintaining the spirit and scope of the invention.

The first illustrative method for combining an alternate word list generated by the method of the invention with another alternate word list will now be described. If the number of words that the present invention generates (designated "k") is less than M (maximum number of desired alternative words), then add the word with the highest score from the list generated by the present invention which is not already present in the other list until the required number of words M is obtained.

The second illustrative method for combining an alternate word list generated by the method of the invention with another alternate word list will now be described. Words are alternately selected from each of the lists, moving from the higher scores to the lower scores (with no repetition) until the required number of words M is obtained.

The third illustrative method for combining an alternate word list generated by the method of the invention with another alternate word list will now be described. Determine from some training data regression functions f and g which estimate the probability that a given alternate word is the correct word given its score. Suppose function f specifies the "probability of the correct word" for conventionally generated alternate word lists and function g specifies the same number for lists generated by the confusability method. We can combine the two lists and sort by the scores f(s) and g(t). We implemented the estimation of regression functions f and g by a non-parametric method. We divided the scores into ranges and for each range of scores we counted the number of alternate words with scores in that range that were correct. We then normalized these counts to obtain a probability-of-correct-word for each range of scores. We did this for lists and scores generated by the prior art, and also for those generated using acoustic confusability, obtaining functions f and g respectively.

Figure 2:
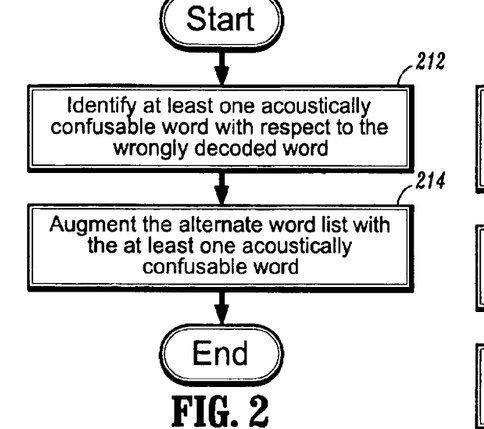
FIG. 2 is a flow diagram illustrating a method for augmenting an alternate word list generated by a speech recognition system, according to an illustrative embodiment of the invention.

FIG. 2 is a flow diagram illustrating a method for augmenting an alternate word list generated by a speech recognition system, according to an illustrative embodiment of the invention. The alternate word list includes at least one potentially correct word for replacing a wrongly decoded word.

At least one acoustically confusable word is identified with respect to the wrongly decoded word (step 212). The alternate word list is augmented with the at least acoustically confusable word (step 214).

Figure 3:
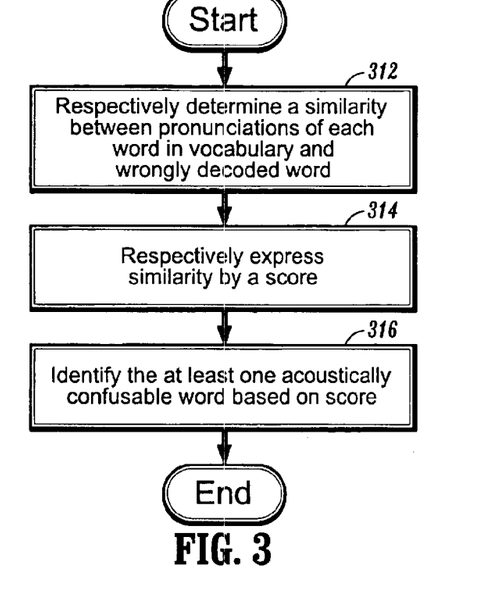
FIG. 3 is a flow diagram further illustrating step 212 of FIG. 2, according to an illustrative embodiment of the invention.

FIG. 3 is a flow diagram further illustrating step 212 of FIG. 2, according to an illustrative embodiment of the invention. As is known, a speech recognition system, such as that described with respect to FIG. 2, includes a vocabulary having a plurality of words included therein.

A similarity between pronunciations of each of at least one of the plurality of words included in the vocabulary is respectively determined with respect to the wrongly decoded word (step 312). The similarity is respectively expressed by a score (step 314). The at least one acoustically confusable word is identified based on the score (step 316).

Figure 4:
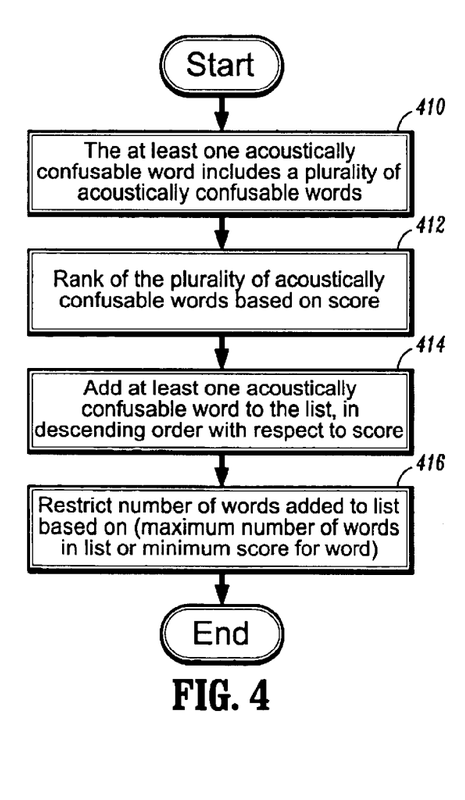
FIG. 4 is a block diagram further illustrating step 214 of FIG. 2, according to an illustrative embodiment of the invention.

FIG. 4 is a block diagram further illustrating step 214 of FIG. 2, according to an illustrative embodiment of the invention. In the embodiment of FIG. 4, the at least one acoustically confusable word includes a plurality of acoustically confusable words (410).

Each of the plurality of acoustically confusable words is ranked based on the score (of step 314 of FIG. 3) (step 412). At least one of the plurality of acoustically confusable words is added to the alternate word list, in descending order with respect to the score (step 414). The number of words added to the alternate word list is restricted based on predefined threshold (step 416). The predefined threshold may correspond to, for example, a maximum number of words (e.g., M, as described above) to be added to the alternate word list or a minimum score (e.g., $P(w|w_i)$) for words to be added to the alternate word list.

Figure 5:
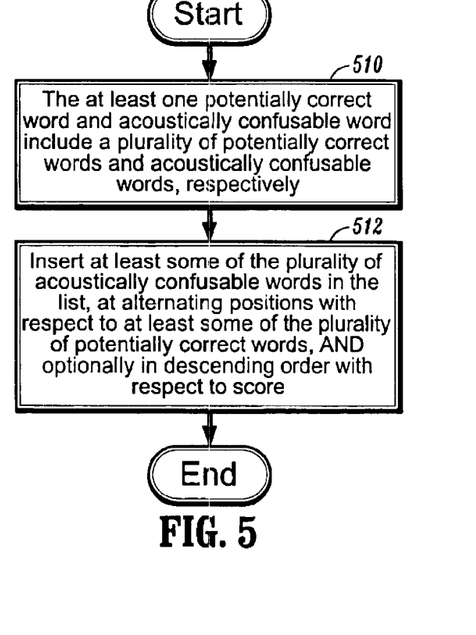
FIG. 5 is a block diagram further illustrating step 214 of FIG. 2, according to another illustrative embodiment of the invention.

FIG. 5 is a block diagram further illustrating step 214 of FIG. 2, according to another illustrative embodiment of the invention. In the embodiment of FIG. 4, the at least one potentially correct word includes a plurality of potentially correct words, and the at least one acoustically confusable word includes a plurality of acoustically confusable words (510).

At least some of the plurality of acoustically confusable words are inserted in the alternate word list so as to be disposed in alternating positions with respect to at least some of the plurality of potentially correct words (step 512). At step 512, the at least some of the plurality of acoustically confusable words may be inserted in the alternate word list in descending order with respect to the score.

The number of words added to the alternate word list is restricted based on predefined threshold (step 516).

Figure 6:
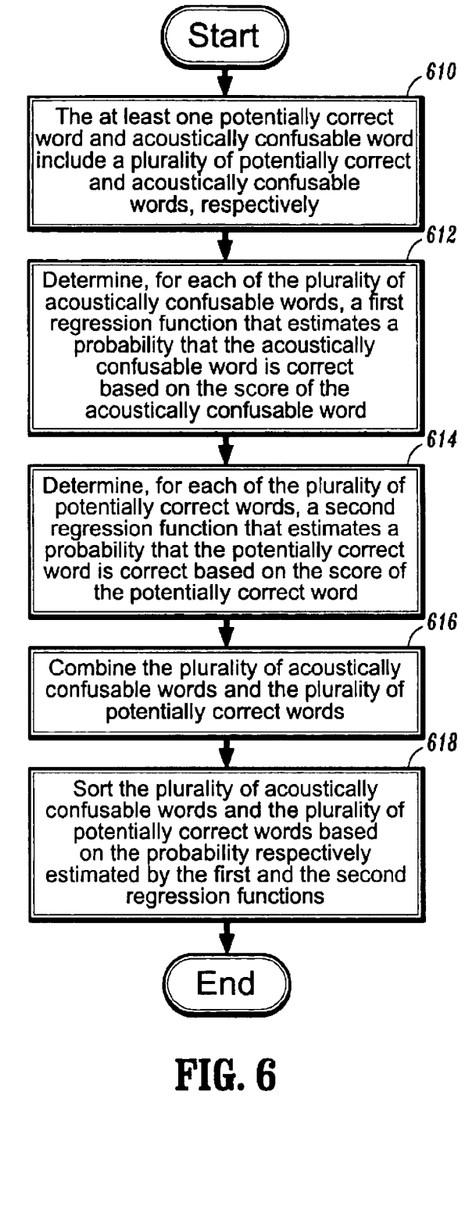
FIG. 6 is a block diagram further illustrating step 214 of FIG. 2, according to yet another illustrative embodiment of the invention.

FIG. 6 is a block diagram further illustrating step 214 of FIG. 2, according to yet another illustrative embodiment of the invention. In the embodiment of FIG. 6, the at least one potentially correct word includes a plurality of potentially correct words, and the at least one acoustically confusable word includes a plurality of acoustically confusable words (610).

A first regression function is determined that estimates, for each of the plurality of acoustically confusable words, a probability that the each of the plurality of acoustically confusable words is correct based on the score of the each of the plurality of acoustically confusable words (step 612). A second regression function is determined that estimates, for each of the plurality of potentially correct words, a probability that the each of the plurality of potentially correct words is correct based on the score of the each of the plurality of potentially correct words (step 614).

The plurality of acoustically confusable words and the plurality of potentially correct words are combined (step 616). The plurality of acoustically confusable words and the plurality of potentially correct words are sorted based on the probability respectively estimated by the first and the second regression functions (step 618).

Figure 7:
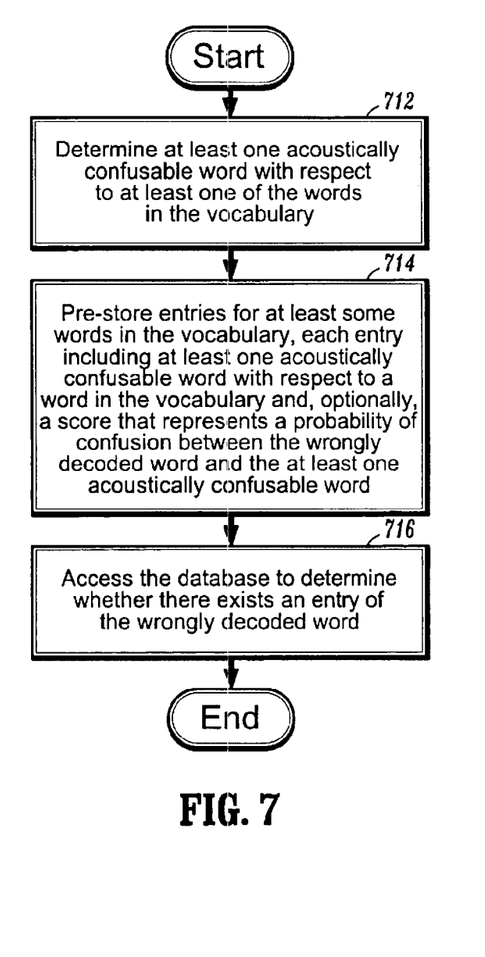
FIG. 7 is a flow diagram illustrating an extension of the method of FIG. 2, according to an illustrative embodiment of the invention.

FIG. 7 is a flow diagram illustrating an extension of the method of FIG. 2, according to an illustrative embodiment of the invention. As is known, a speech recognition system, such as that described with respect to FIG. 2, includes a vocabulary having a plurality of words included therein.

At least one acoustically confusable word is determined with respect to each of at least one of the plurality of words comprised in the vocabulary (step 712). It is to be appreciated that step 712 may be considered to be encompassed within step 212 of FIG. 2, or may be performed independently before step 712.

A plurality of entries for at least some of the plurality of words included in the vocabulary are pre-stored in a database (step 714). Each of the plurality of entries includes at least one word that is acoustically confusable with respect to the each of the at least some of the plurality of words included in the vocabulary. Each of the plurality of entries may also include, for each of the at least one word in an entry, a score that represents a probability of acoustic confusion between the wrongly decoded word and the at least one word.

The database is accessed to determine whether there exists an entry for the wrongly decoded word (step 716). It is to be appreciated that step 712 may be considered to be encompassed within step 212 of FIG. 2.

Experimental test results will now be described in detail. Initially, it is to be noted that of the three illustrative methods described above for computing $P(ww_i)$ and the three illustrative methods for combining an alternate word list generated by the method of the invention with another alternate word list work, the first of each have been found to produce the best results. This arrangement is considered the preferred embodiment of the invention.

As noted above, conventional methods for generating alternate word lists generally do not produce the desired number of alternative words (e.g., fifteen). Instead, frequently less alternative words are generated (usually about twelve alternative words). In fact, sometimes no alternative words are generated.

With respect to conventional methods for generating an alternate word list, the correct word was in the list of alternates about 54% of the time. In contrast, in the preferred embodiment of the invention described above, the correct word was in the list 68% of the time, with an addition of three words on the average. Thus, a 14% increase was achieved by the invention over using conventional methods alone. The mean position of the correct word on the list was increased by only about one position. Thus, the method of the invention generally does not cause the correct word to appear at the end of the list (which would decrease the method's usefulness).

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for augmenting an alternate word list generated by a speech recognition system, the alternate word list including at least one potentially correct word for replacing a wrongly decoded word, said method comprising the steps of:
   identifying at least one acoustically confusable word with respect to the wrongly decoded word;
   calculating a probability that the at least one acoustically confusable word is similar in pronunciation to the wrongly decoded word; and
   augmenting the alternate word list with the at least one acoustically confusable word based on the probability.

2. The method according to claim 1, wherein said augmenting step comprises the step of adding the at least one acoustically confusable word to the alternate word list.

3. The method according to claim 1, wherein the system includes a vocabulary having a plurality of words comprised therein, and said identifying step comprises the steps of:
   respectively determining a similarity between pronunciations of each of at least one of the plurality of words comprised in the vocabulary with respect to the wrongly decoded word; and
   respectively expressing the similarity by a score.

4. The method according to claim 3, wherein said identifying step identifies the at least one acoustically confusable word based on the score.

5. The method according to claim 3, wherein the at least one acoustically confusable word comprises a plurality of acoustically confusable words, and said augmenting step comprises the steps of:
   ranking each of the plurality of acoustically confusable words based on the score; and
   adding at least one of the plurality of acoustically confusable words to the alternate word list, in descending order with respect to the score.

6. The method according to claim 5, wherein said augmenting step further comprises the step of restricting a number of words added to the alternate word list based on a predefined threshold.

7. The method according to claim 6, wherein the predefined threshold corresponds to a maximum number of words to be added to the alternate word list.

8. The method according to claim 6, wherein the predefined threshold corresponds to a maximum size of the alternate word list.

9. The method according to claim 6, wherein the predefined threshold corresponds to a minimum score for words to be added to the alternate word list.

10. The method according to claim 3, wherein the at least one potentially correct word comprises a plurality of potentially correct words and the at least one acoustically confusable word comprises a plurality of acoustically confusable words, and said method further comprises the step of inserting at least some of the plurality of acoustically confusable words in the alternate word list so as to be disposed in alternating positions with respect to at least some of the plurality of potentially correct words.

11. The method according to claim 10, wherein the some of the plurality of acoustically confusable words are inserted in the alternate word list in descending order with respect to the score.

12. The method according to claim 5, wherein said adding step adds only words not already present in the alternate word list.

13. The method according to claim 3, wherein the at least one potentially correct word comprises a plurality of potentially correct words and the at least one acoustically confusable word comprises a plurality of acoustically confusable words, and said augmenting step comprises the steps of:
   determining a first regression function that estimates, for each of the plurality of acoustically confusable words, a probability that the each of the plurality of acoustically confusable words is correct based on the score of the each of the plurality of acoustically confusable words; and
   determining a second regression function that estimates, for each of the plurality of potentially correct words, a probability that the each of the plurality of potentially correct words is correct based on the score of the each of the plurality of potentially correct words;
   combining the plurality of acoustically confusable words and the plurality of potentially correct words; and
   sorting the plurality of acoustically confusable words and the plurality of potentially correct words based on the probability respectively estimated by the first and the second regression functions.

14. The method according to claim 1, wherein the speech recognition system includes a vocabulary having a plurality of words comprised therein, and said method further comprises the step of determining the at least one acoustically confusable word with respect to each of at least one of the plurality of words comprised in the vocabulary.

15. The method according to claim 14, further comprising the step of pre-storing in a database a plurality of entries for at least some of the plurality of words comprised in the vocabulary, each of the plurality of entries comprising at least one word that is acoustically confusable with respect to each of the at least some of the plurality of words comprised in the vocabulary.

16. The method according to claim 15, wherein said identifying step comprises the step of accessing the database to determine whether there exists an entry for the wrongly decoded word.

17. The method according to claim 15, wherein each of the plurality of entries further comprises, for each of the at least one word, a score that represents a probability of acoustic confusion between the wrongly decoded word and the at least one word.

18. The method according to claim 1, wherein said method is implemented by a program storage device readable by machine, tangibly embodying a program of instructions executable by the machine to perform said method steps.

19. A method for augmenting an alternate word list generated by a speech recognition system, the alternate word list including at least one potentially correct word for replacing a wrongly decoded word, said method comprising the steps of:
   identifying a set of acoustically confusable words with respect to the wrongly decoded word;
   wherein the step of identifying comprises the steps of respectively determining a similarity between pronunciations of each of at least one of the plurality of words comprised in the vocabulary with respect to the wrongly decoded word; and respectively expressing the similarity by a score; and
   augmenting the alternate word list with at least one acoustically confusable word from the set;

wherein augmenting the alternate word list comprises the steps of ranking the at least one acoustically confusable word from the set based on the score; adding the at least one acoustically confusable word from the set to the alternate word list, in descending order with respect to the score; and restricting a number of words added to the alternate word list based on a predefined threshold.

20. The method according to claim 19, wherein said method is implemented by a program storage device readable by machine, tangibly embodying a program of instructions executable by the machine to perform said method steps.

21. In a speech recognition system having a vocabulary, a method for augmenting an alternate word list generated by the system, the alternate word list including at least one potentially correct word for replacing a wrongly decoded word, said method comprising the steps of:

identifying a set of acoustically confusable words with respect to the wrongly decoded word, based on a similarity of pronunciations therebetween;

calculating a probability that at least one acoustically confusable word from the set is similar in pronunciation to the wrongly decoded word; and augmenting the alternate word list with the at least one acoustically confusable word from the set based on the probability.

22. The method according to claim 21, wherein said method is implemented by a program storage device readable by machine, tangibly embodying a program of instructions executable by the machine to perform said method steps.

* * * * *